US006175436B1

(12) United States Patent
Jackel

(10) Patent No.: US 6,175,436 B1
(45) Date of Patent: Jan. 16, 2001

(54) AUTOMATIC FEEDBACK GAIN CONTROL FOR MULTIPLE CHANNELS IN A DOPED OPTICAL FIBER AMPLIFIER

(75) Inventor: Janet L. Jackel, Holmdel, NJ (US)

(73) Assignee: Tellium, Inc., Oceanport, NJ (US)

( * ) Notice: Under 35 U.S.C. 154(b), the term of this patent shall be extended for 0 days.

(21) Appl. No.: 08/688,588

(22) Filed: Jul. 30, 1996

(51) Int. Cl.$^7$ .................................................. H04B 10/17
(52) U.S. Cl. ...................... 359/179; 359/176; 359/124; 359/337; 359/349
(58) Field of Search .................................. 359/124, 127, 359/134, 177, 179, 337, 341, 349

(56) References Cited

U.S. PATENT DOCUMENTS

| | | | |
|---|---|---|---|
| 5,002,349 | 3/1991 | Cheung et al. ........................ | 359/127 |
| 5,396,360 | * 3/1995 | Majima ................................. | 359/133 |
| 5,414,540 | 5/1995 | Patel et al. ............................. | 359/39 |
| 5,414,541 | 5/1995 | Patel et al. ............................. | 359/39 |
| 5,510,926 | * 4/1996 | Bayart et al. ......................... | 359/179 |
| 5,633,749 | * 5/1997 | Shibuya ................................ | 359/177 |
| 5,644,423 | * 7/1997 | Iwano .................................... | 359/177 |

FOREIGN PATENT DOCUMENTS

| | | | |
|---|---|---|---|
| 497 492 A2 | 8/1992 | (EP) . | |
| 0637148 | * 2/1995 | (EP) ..................................... | 359/177 |
| 2 281 669 | 3/1995 | (GB) . | |

OTHER PUBLICATIONS

Brackett et al., A Scalable Multiwavelength Multihop Optical Network: A Proposal for Research on All–Optical Networks, *Journal of Lightwave Technology*, vol. 11, 1993, pp. 736–753.

Fake et al., "Optically stabilized EDFA for in–band WDM systems," *Technical Digest, Optical Fiber Conference '95*, paper TuP3, pp. 79, 80.

Okamura, "Automatic Optical Loss Compensation with Erbium–Doped Fiber Amplifier," *Journal of Lightwave Technology*, vol. 10, 1992, pp. 1110–1116.

Zirngibl, "Gain control in erbium–doped fibre amplifiers by an all–optical feedback loop," *Electronics Letters*, vol. 27, 1991, pp. 550, 561.

* cited by examiner

Primary Examiner—Leslie Pascal
(74) *Attorney, Agent, or Firm*—Morgan, Lewis & Bockius LLP

(57) ABSTRACT

An apparatus and method for controlling the gain in an erbium-doped fiber amplifier (EDFA) incorporated into a multi-wavelength communication system so as to amplify each of the wavelength signals. The amplifier operates near to saturation so that, if one or more of the multi-wavelength signals is removed from the transmission, the remaining channels are increasingly amplified, leading to problems with other components in the system which depend upon intensity. According to the invention, an optical signal at a wavelength that is not within any of the transmission channels is selectively fed back around the amplifier and caused to lase in a wavelength-filtered ring-laser configuration. The lasing signal governs the saturation of the amplifier such that any gain shed by a disappearing data signal is predominately used by the lasing signal, not by the remaining data signals. Thereby, the data signals do not experience gain variations dependent upon the number of data signals being amplified. In a chain of amplifiers on a long link, the wavelength of the lasing signal is chosen to lie within the gain flat band of the amplifier and is output from the equalized amplifier with the same efficiency as all the transmission signals to be received by the next amplifier. Thereby, only the first amplifier needs to be equalized.

33 Claims, 7 Drawing Sheets

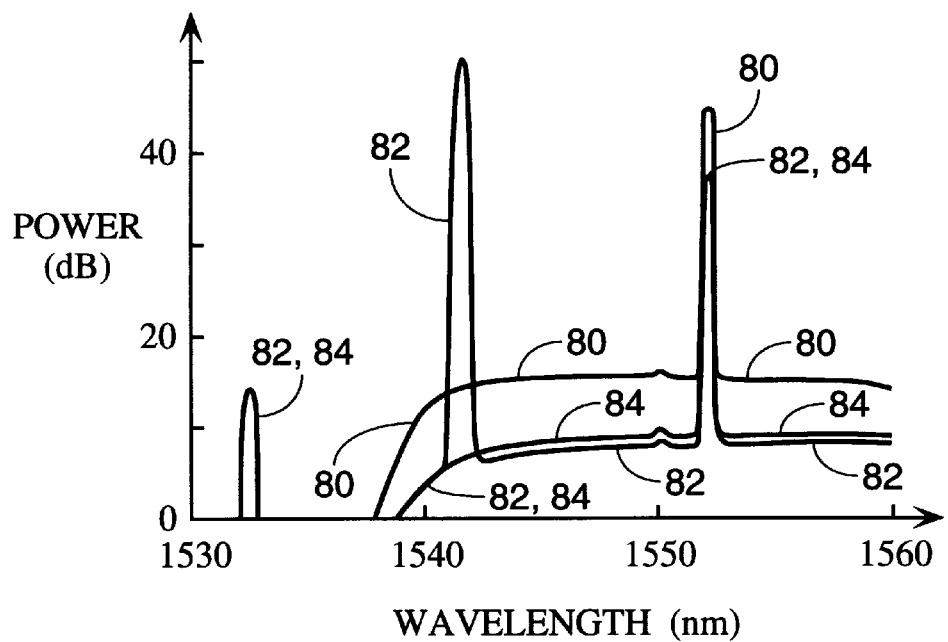
FIG. 10
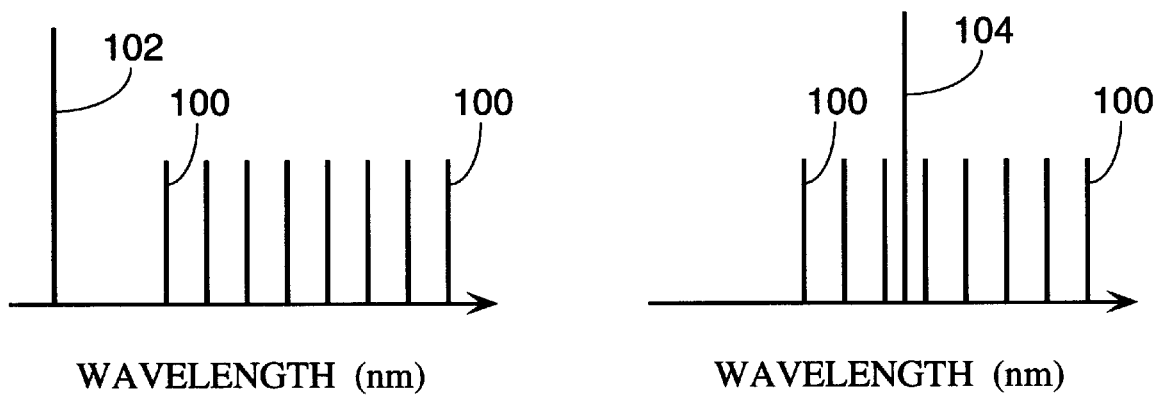
FIG. 11
FIG. 12

AUTOMATIC FEEDBACK GAIN CONTROL FOR MULTIPLE CHANNELS IN A DOPED OPTICAL FIBER AMPLIFIER

GOVERNMENT INTEREST

This invention was made at least partially under government funding agreement MDA972-95-3-0027, awarded by the Advanced Projects Research Agency.

FIELD OF THE INVENTION

The invention relates generally to optical fibers and optical amplifiers. In particular, it relates to gain stabilization in erbium-doped fiber amplifiers for multi-wavelength signals.

BACKGROUND ART

Modern communication networks are increasingly being implemented with optical fiber being used as the transmission medium. Fiber's early usage was concentrated on long haul transmission in which its huge bandwidth, measured in hundreds of terahertz, could be more immediately exploited. However, well made single-mode optical fiber exhibits relatively low but still finite absorption. Its useful transmission length is measured in tens to hundreds of kilometers at which point the signal amplitude has decreased so much that the signal is no longer readily detected.

In older systems, optical regenerators were placed periodically along a fiber transmission path. A regenerator detects the optical signal and converts it to electrical form, that is for most systems, detects the intensity of the optical envelope which corresponds to the electrical signal used to modulate the laser at the transmitting end. The regenerator then processes the electrical signal to regenerate a copy of the original modulating signal, and the copy is used to modulate another laser impressing its modulated optical signal on the next fiber link. Regenerators, however, tend to be expensive since they need to incorporate complex high-speed electronic circuitry. Furthermore, the design, construction, and operation of regenerators depend strongly on the data rate and the data format of the impressed electrical signal. If the data rate or format changes, the regenerators need to be replaced even though the fiber needs no adjustment for the changes and upgrades.

Erbium-doped fiber amplifiers (EDFAs) were discovered around 1987 to amplify an optical signal near the important fiber band around 1550 nm, at which wavelength the silica fiber absorption is a minimum, and they have gained nearly immediate acceptance in the telecommunications industry as a replacement for optical regenerators. In an EDFA, a silica-based fiber is doped with erbium, which forms an optically active ion having a number of excitable metastable states. A pump laser having a wavelength of, for example, 980 nm or 1490 nm, optically pumps the erbium ions until their state population is inverted. An optical signal traversing the region of inverted population will absorb energy from the excited ions and will thus grow in intensity.

Wavelength-division multiplexing (WDM) was being developed contemporaneously with erbium-doped fiber amplifiers. The data capacity of an optical-fiber transmission link is generally limited not by the fiber but by the electronics and opto-electronics at its two ends. In WDM, separate electrical circuits create separately modulated optical signals having different optical carrier wavelengths, and these multi-wavelength signals are combined (multiplexed) and carried on one optical fiber. At the receiving end of the fiber, the multi-wavelength signals are optically demultiplexed and thereafter separately detected. Thereby, the capacity of the fiber is increased by the number of wavelength channels.

Erbium-doped fiber amplifiers offer distinct advantages for WDM systems. A representative gain spectrum 10 for an EDFA is shown in FIG. 1 although the details depend upon many factors not to be discussed here. The illustrated spectrum 10 has been optimized for a relatively wide flat-gain band 12 between about 1540 and 1560 nm, but a relatively intense gain peak 14 exists around 1532 nm, corresponding to a peak in the amplified stimulated emission (ASE) at the same wavelength.

It is important that the different WDM channels experience approximately equal gain at each amplifier in a multi-amplifier chain. Otherwise, the differences exponentially increase along the chain to the point that the different WDM signals cannot be treated equivalently. Placing all the WDM channels in the flat-gain band 12 reduces the differential gain problem. Eight WDM channels with equal 2 nm spacings can be placed in this band 12, a demanding but not impossible design. This even arrangement of WDM channels is referred to as a wavelength comb. The wavelength channels, however, can be dispersed within the flat-gain band 12 with unequal spacings. Such uneven spacings affect neither the problems discussed below nor the solutions provided by the invention.

A further problem with the operation of EDFAs in a WDM system arises from the operational fact that not all the WDM channels are necessarily being used at the same time. Some channels may be dark. The variability of channel number is an especial problem in all-optical WDM networks in which optical signals are switched between different fibers according to the respective wavelengths of the signals. A simple exemplary WDM network, shown in FIG. 2, includes three terminal nodes 20, 22, 24, which are linked by optical fibers through a wavelength-selective switch 26 which directs an optical signal according to its wavelength. The switch 26 can be reconfigured between selected switching states. Importantly for this invention, the fiber link 28 between the switch 26 and the third node 24 is long and contains several amplifiers 30 spaced along its length. At some times, the first node 20 may be sending one channel at $\lambda_1$ to the second node 22 and a second channel at $\lambda_2$ to the distant third node 24 while at other times, it may be sending both channels $\lambda_1, \lambda_2$ to the third node 24. The same situation obtains if the two channels originate from different nodes 20, 22 and are directed to a common node 24, but both channels are not always active. In either case, dependent upon traffic, the number of channels on the long fiber 28 will vary.

An erbium-doped fiber amplifier shows a complex relation between the input and output powers. That is, the gain G which is the ratio of the output to input powers $P_{OUT}/P_{IN}$ depends on the magnitude of power. The linearly scaled graph of FIG. 3 plots optical output power $P_{OUT}$ as a function of optical input power $P_{IN}$ at a fixed pump power. In a constant gain region 32, the two powers are proportionally related, and the gain G is constant. However, an EDFA can provide only a finite amount of optical output power, and in a saturation region 34 further increases in input power produce progressively smaller increases in output power. The graph of FIG. 3 can be replotted, as shown in FIG. 4, for the gain as a function of input power $P_{IN}$. The numerical values of this (graph are measured values but are given only as representative since they depend on many factors, but the general trends are considered to be nearly universal. It is seen that gain is relatively flat at lower input power but falls off for high values of input power. The fall off is even more dramatic when gain is plotted as a function of output power.

It is general practice to operate an erbium-doped fiber amplifier in saturation for at least two reasons. Over some power range, the signal-to-noise ratio is better in saturation. Also, a saturated amplifier produces an output that has a relatively fixed amplitude regardless of the input power. That is, the output level is typically clamped. With clamped outputs, all the transmitters and amplifiers of an entire network do not need to be concurrently tuned to produce acceptable signal levels at the network output if the intermediate amplifiers tend to output signals of a fixed level.

However, the saturation effects shown in FIGS. 3 and 4 in a homogeneously broadened EDFA depend upon the total optical power, that is, the sum of the optical powers in a multi-wavelength WDM signal. The distinction between homogeneously and inhomogeneously broadened EDFAs will not be discussed, but a silica-based EDFA is homogeneously broadened, at least at room temperature. Ideally, N active WDM channels will have N times the optical power as one active WDM channel however, a saturated amplifier will amplify each of N input signals less than it would amplify one input signal because its available gain is spread between more channels. Typically, halving the number of active WDM channels will double the output power of each remaining channel, that is, a 3 dB increase. The finite amount of gain power is distributed amount the number of WDM channels being amplified.

Such traffic dependence of the intensities of optical signals places severe constraints on an optical network because many of its optically active components enjoy relatively small operating margins. Even the transmission fiber may experience non-linear effects at undesirably high signal powers. The problem is worsened in all-optical networks that are more complexly connected than that of FIG. 2, such as the type disclosed by Brackett et al. in "A Scalable Multi wavelength Multihop Optical Network: A Proposal for Research on All-Optical Networks, *Journal of Lightwave Technology*, vol. 11, 1993, pp. 736–753. In this case, different signals on one link may have passed through distinctly different paths before being combined on the long fiber link containing one or more amplifiers. Assuming that the combining element does not perform signal equalization, if the signal amplitudes are not tightly controlled throughout the network (that is, the gain made constant for all signals at all amplifiers), multiple WDM signals on one link may have significantly different intensities.

Thus, it is greatly desired to stabilize the gain of erbium-doped fiber amplifiers or whatever other kinds of amplifiers are used in an optical network so that their gain is relatively independent of the number of channels being amplified.

It would be possible to monitor the number of channels passing through an amplifier and to accordingly adjust its gain, for example, by changing the pumping power. However, either local monitoring or overall control by the network is difficult and adds undesired cost and complexity to otherwise simple amplifiers. In point-to-point WDM links, the solution is simpler since the channels are available in electronic form at the transmitting end. An extra signal may then be imposed at a wavelength not otherwise used with its intensity level depending on the number of vacant channels. This solution is workable for point-to-point at the cost of some complexity, but becomes less feasible for all-optical networks in which electronic versions of the signals are not readily available at the switching nodes.

Fake et al. have disclosed an automatic gain compensation technique in "Optically stabilized EDFA for in-band WDM systems," *Technical Digest, Optical Fiber Conference '95*, paper TuP3, pp. 79, 80. They have placed the amplifying fiber between two gratings that selectively reflect at a wavelength outside the band of the data signals but within the spontaneous emission band of the EDFA. The gratings multiply reflect the extra signal through the amplifying medium and cause it to lase, thus consuming any extra gain provided by changing numbers of channels. Fake et al.'s approach is relatively inflexible since the interference filter can't be tuned and an attenuator cannot be placed in the feedback loop for the purpose of controlling the feedback intensity.

Okamura in "Automatic Optical Loss Compensation with Erbium-Doped Fiber Amplifier," *Journal of Lightwave Technology*, vol. 10, 1992, pp. 1110–1116 have disclosed a technique for automatic gain control so as to stabilize output power. Okamura, in one embodiment, use a feedback loop around the EDFA having a narrow, out-of-band wavelength band to cause lasing at that wavelength. In an experimental circuit, he uses a modulated attenuator in the feedback loop. Zirngibl has disclosed a similar feedback structure in "Gain control in erbium-doped fibre amplifiers by an all-optical feedback loop," *Electronics Letters*, vol. 27, 1991, pp. 560, 561.

Longer transmission links may require that multiple amplifiers be placed along the length of the link in a chain arrangement. The same problem of the amplifier gain depending upon the number of active channels occurs at each of the sequentially arranged amplifiers even though the number of active channels does not vary along the amplifier chain. Indeed, for non-saturated operation of the amplifiers, the gain variation is multiplicative over the number of amplifiers since, as the number of active channels varies, the fiber loss remains constant but the amplifier gain changes so that the gain variations accumulate.

Accordingly, it is desired to provide an erbium-doped fiber amplifier whose gain is independent of the number of active channels. It is also desired to apply such an amplifier to a multi-amplifier chain in a cost-effective design.

SUMMARY OF THE INVENTION

The invention may be summarized as a gain-compensated optical amplifier, particularly an erbium-doped fiber amplifier in a telecommunications network that is particularly useful for compensating for a varying number of channels being amplified in the gain-saturated amplifier. A feedback loop is created around the amplifier that passes only a signal having a selected wavelength other than the intended data signals. Preferably for a single amplifier, the couplers to and from the loop are wavelength-selective. An attenuator is placed in the loop and is set so that the feedback signal lases. Thereby, the lasing feedback signal consumes most of the excess gain of the saturated amplifier, so that the channel signals experience nearly the same gain regardless of the number of such channels that are active. In a multi-amplifier chain, only the first amplifier requires the feedback loop if the feedback signal is in the flatband of the amplifier and is output to the next amplifier with the same efficiency as the signal wavelengths. That is, the output coupler should be wavelength independent although the input coupler may advantageously be made wavelength selective.

BRIEF DESCRIPTION OF THE DRAWINGS

FIG. 10 is an optical power spectrum measured for the optical circuit of FIG. 9.

FIGS. 11 and 12 are optical spectra showing the wavelength assignments for the WDM system utilizing the invention.

DETAILED DESCRIPTION OF THE PREFERRED EMBODIMENTS

The invention provides automatic compensation at an optical amplifier for a changing number of WDM channels being amplified. As mentioned previously, there may be N WDM channels, N typically being 8 at the present stage of technology, but the number is expected to increase to 16 and possibly beyond as WDM technology advances. Importantly, however, for an N-channel system, at any point in time, it is possible that fewer than N channels are filled with optical power. Any change in the number of active channels tends to cause gain variations in the saturated amplifier as the number of channels changes.

Figure 5:
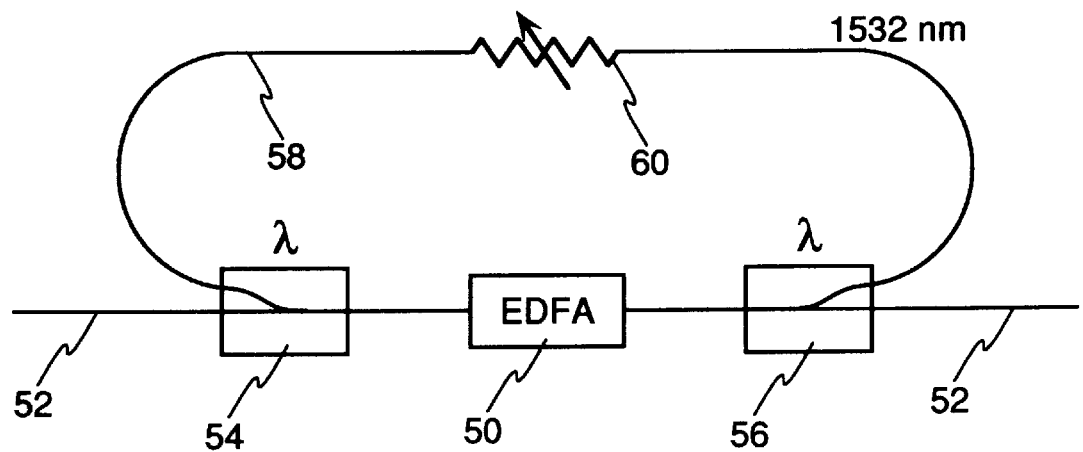
FIG. 5 is an optical circuit diagram for a first embodiment of the invention using wavelength-selective couplers to the feedback loop.

According to the invention, as shown in FIG. 5, an erbium-doped fiber amplifier (EDFA) 50 is placed along an optical fiber 52 carrying multiple WDM channels in the wavelength band of 1540 to 1560 nm. The EDFA 50 is represented as a system complete with pumping source. Often these commercial units include isolators which prevent backward propagation through the amplifier 50 and may also include a filter to eliminate the ASE radiation at its peak in the neighborhood of 1532 nm.

In a first embodiment of the invention, the EDFA 50 is separated from the transmission fiber by two optical couplers 54, 56 which couple a 10 nm passband of optical wavelengths near 1532 nm between the EDFA 50 and a feedback loop comprising a feedback fiber 58 including a variable attenuator 60. The couplers 54, 56 are bidirectional so that the same 10 nm band is passed from the feedback loop in either direction to the EDFA 50, but they substantially block this band from either the input or output side of the transmission fiber 52.

Figure 1:
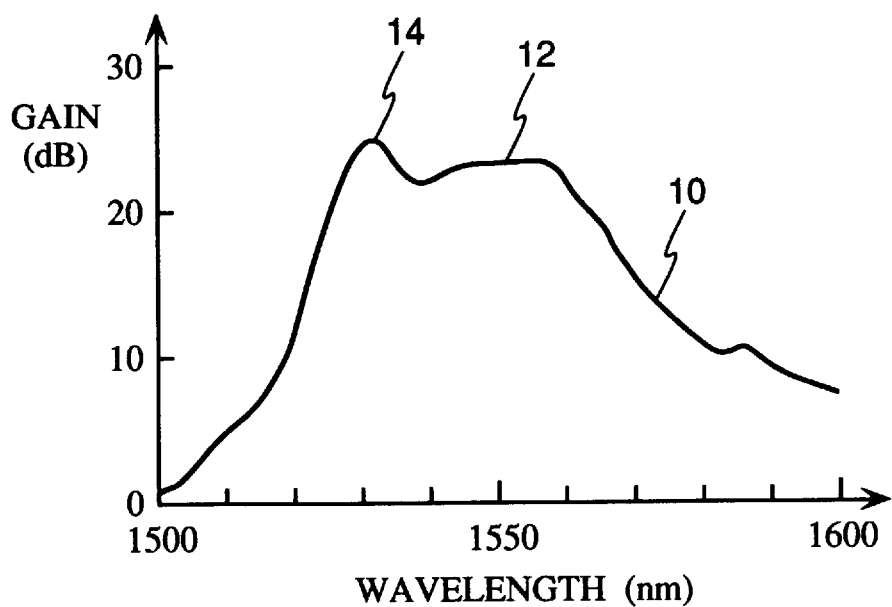
FIG. 1 is a graph of gain spectrum of a representative erbium-doped fiber amplifier.
Figure 2:
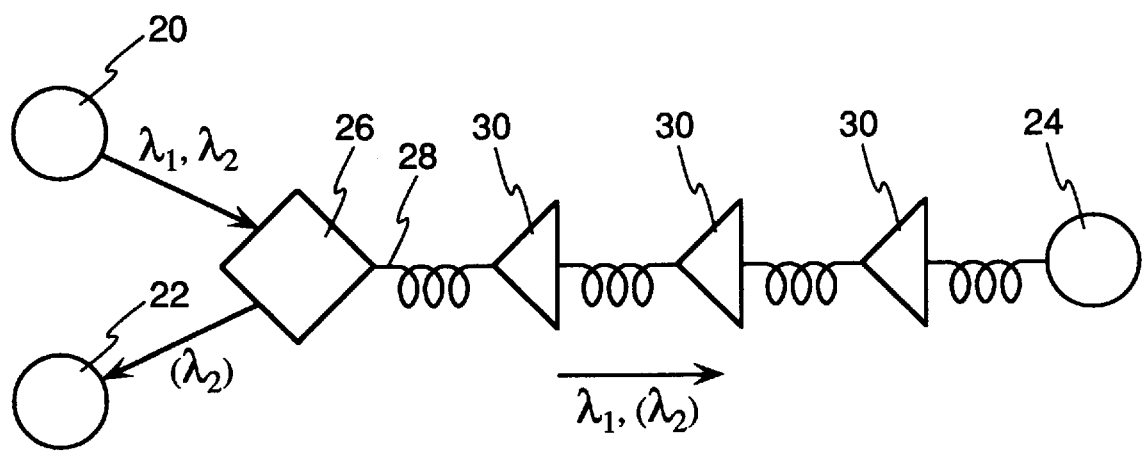
FIG. 2 is a network diagram of an example of a wavelength-division multiplexed (WDM) optical network.
Figure 3:
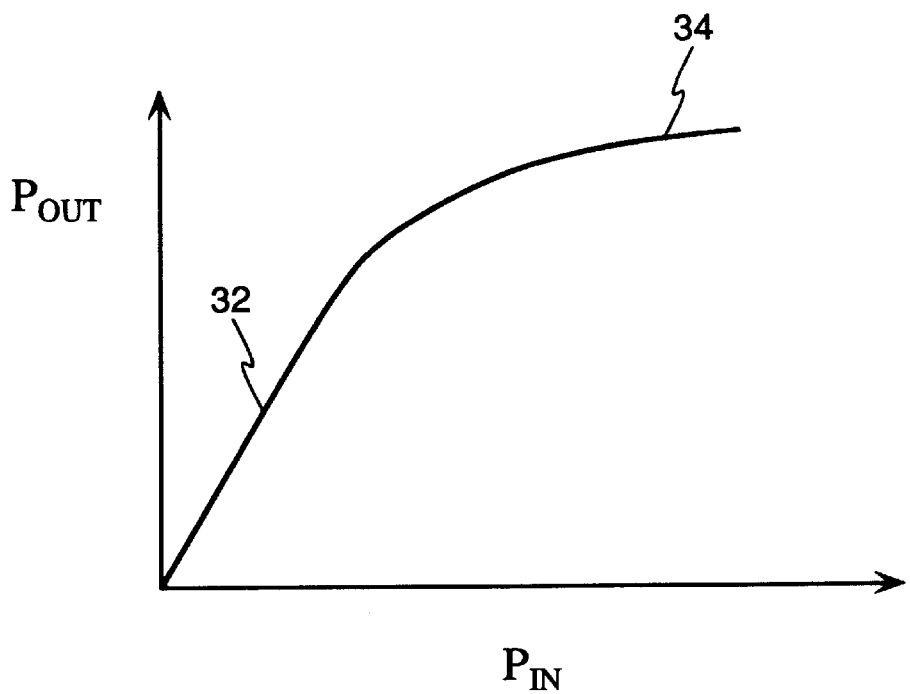
FIG. 3 is a graph showing the power saturation effect in a fiber amplifier.
Figure 4:
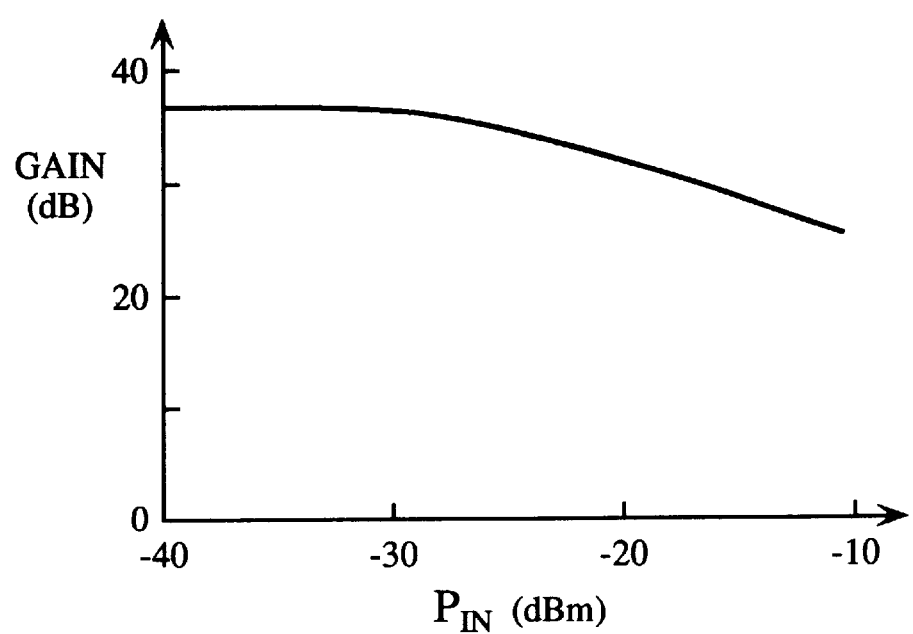
FIG. 4 is a graph, similar to that of FIG. 3, but replotted to show gain as a function of input power and also showing actual experimental data.

The result is that within the narrow passband a significant portion of the optical energy arising from spontaneous emission is fed back through the EDFA 50 to be amplified therein. Let the gain of the EDFA 50 within the passband be represented by G, the loss introduced by the variable attenuator be represented by $L_A$, and the coupling loss introduced by the two couplers 54, 56, fiber splices, and other losses be represented by $L_C$. If the gain within the feedback loop exceeds the losses $$G > L_A + L_C \qquad (1)$$

for a wavelength $\lambda_L$ within the passband, optical radiation at this wavelength $\lambda_L$ will be increasingly amplified as it repetitively passes around the loop, and radiation at the wavelength of maximum net gain will begin to lase and to consume a substantial portion of the available excess gain from the EDFA 50. Of course, the lasing wavelength $\lambda_L$ cannot be one of the signal wavelengths, but it can be either outside of the wavelength comb of the WDM signal or can be within the comb but between two adjacent WDM wavelengths. The peak ASE wavelength 14 around 1532 nm shown in FIG. 1 provides a ready source of optical radiation to be amplified. However, other portions of the optical gain spectrum 10 can also be used, including unused wavelengths within the flat band portion 12. The attenuator 60 is set so that the signal at the lasing wavelength $\lambda_L$ is barely lasing in the condition of all data signals being present. This condition guarantees that the lasing signal uses most of the available excess gain but does not significantly reduce the available gain when all transmission channels are present. Once the variable attenuator 60 is adjusted to just barely permit lasing, it is not normally readjusted during normal operation of the fiber amplifier 50.

Figure 6:
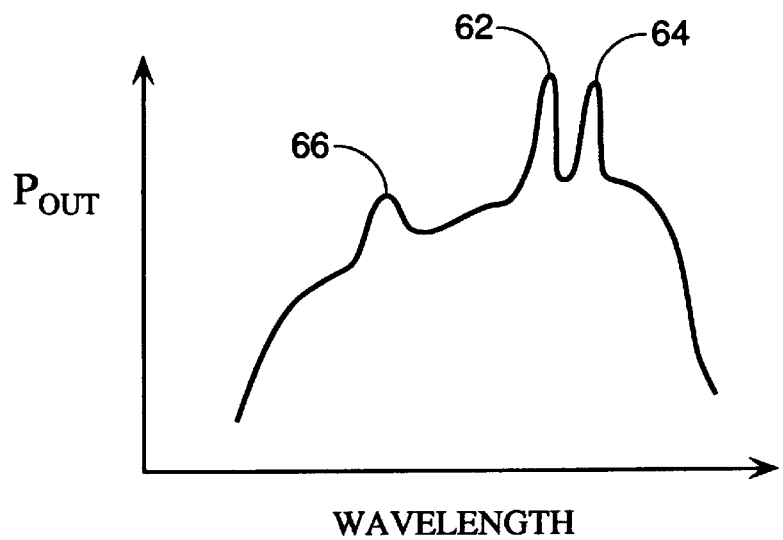
FIGS. 6 through 8 are schematical graphs showing the effect on output power for the circuit of FIG. 5 when the number of wavelength channels is varied.
Figure 7:
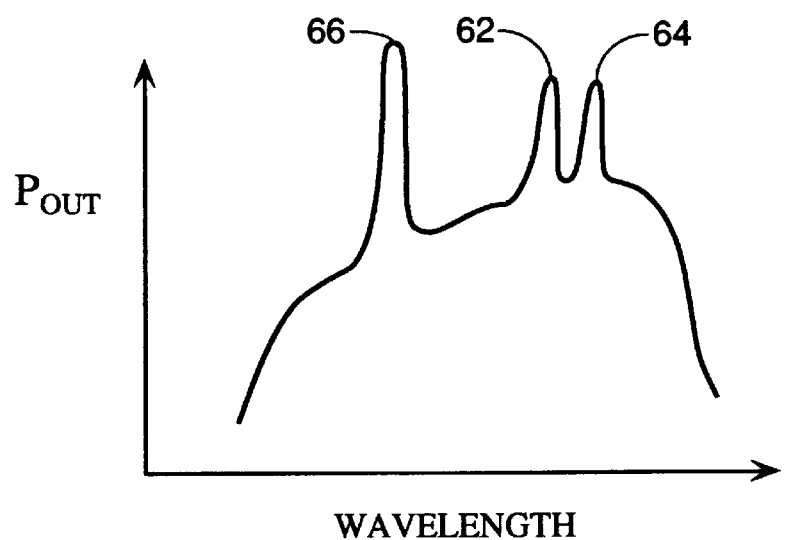
Figure 8:
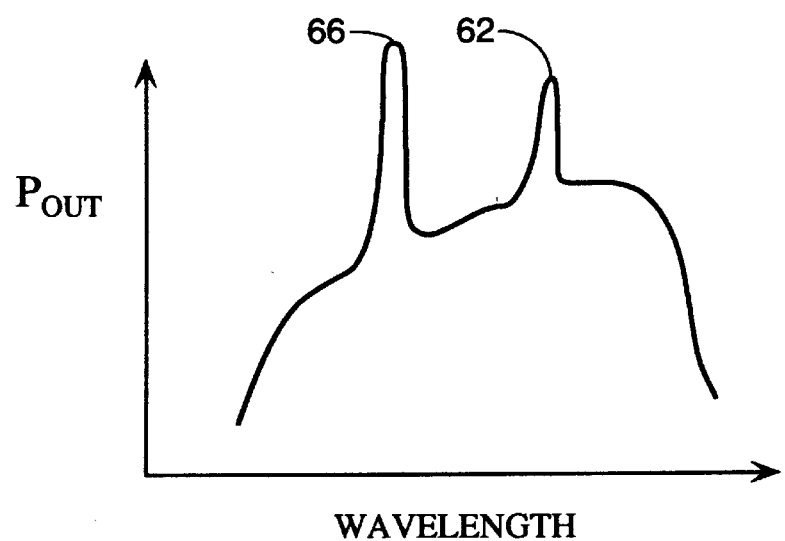

The intended operation of the invention is schematically illustrated in the output power spectra of FIGS. 6 through 8. The spectrum of FIG. 6 is the output of a conventional erbium-doped fiber amplifier without the inventive feedback. It amplifies a first and a second WDM signal 62, 64. There is a strong ASE signal 66 at the ASE peak, but in a well designed system its level is kept below the levels of the WDM signals 62, 64. The spectrum of FIG. 7 is the output of the inventive erbium-doped fiber amplifier with the ASE signal 66 lasing to a much higher intensity level. The overall gain of the amplifier is adjusted so that two WDM signals 62, 64 are amplified to their previous levels. The spectrum of FIG. 8 shows that for the invention, when the second WDM signal 64 becomes inactive, the gain of the first WDM signal 62 is not significantly increased because most of the saturated amplifier gain is consumed by the lasing signal 66.

Figure 9:
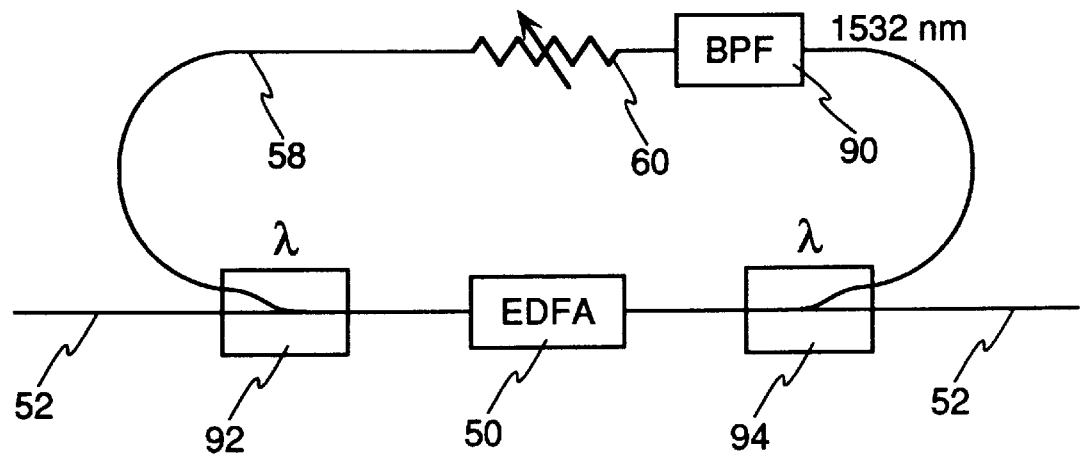
FIG. 9 is an optical circuit diagram of a second embodiment of the invention using wavelength-independent couplers to the feedback loop and a filter in the loop.

Another embodiment of invention is illustrated in the schematic of FIG. 9 and includes in the feedback loop both the variable attenuator 60 and a narrow-passband filter 90 at the wavelength desired to be lased, for example, the ASE peak near 1532 nm. Two relatively wavelength-insensitive couplers 92, 94 couple a fraction of the total bandwidth power into the feedback loop. Their wavelength insensitivity should extend over the entire wavelength range of the data signals in order to not perturb the gain flatness of the EDFA. The lasing wavelength $\lambda_L$ is determined by the filter 90. The structure of the equalized amplifier of FIG. 9 resembles that of Zirngibl, ibid. The operation of the embodiment of FIG. 9 is similar to that of the embodiment of FIG. 5. The couplers 92, 94 couple a fraction of all the wavelengths in the feedback loop 58, but only the selected lasing wavelength is allowed to pass the feedback filter 90. The signal at this selected wavelength, even though it arises from noise, lases if the variable attenuator 60 is set for a loss below the lasing threshold of Eqn. (1).

The fractional feedback through the wavelength-insensitive amplifiers is less than 50% (−3 dB) and preferably 10% (−10 dB) or less. The amount of desired feedback is determined by the intended equalized gain of the amplifier. If the gain is to be fixed to 18 dB, then the feedback loop and its associated couplers and attenuators must provide slightly less than 18 dB of loss at the lasing wavelength. Some of this loss is provided by the connectors and by the two couplers. Experimentally, it has been found that an added loss of 12 dB to 15 dB is sufficient to keep the fed back wavelength just barely lasing when all signals are present. These latter values are consistent with the values presented immediately above. However, if the intrinsic losses of the connectors and couplers can be reduced, then more signal energy can be immediately output with an increase in the required controlled loss in the feedback loop.

Although the embodiment of FIG. 9 shows a narrow bandpass filter 90, if the lasing wavelength is selected to be outside the wavelength comb, a low-pass or high-pass filter could be substituted that would block the wavelength comb and pass a wavelength of sufficiently high net gain that its signal would lase. The same comments apply to the wavelength-selective couplers 54, 56 of FIG. 5. It should also be noted that some fraction of the data signals can be circulated through the feedback loop as long as their net gain is less than unity. That is, the loop must be gain/loss selective to the lasing wavelength of the WDM wavelengths.

The embodiment of FIG. 9 has the disadvantage that some of the amplified data signal is sacrificed in the feedback loop, where it is then blocked. This loss of amplified data signal is disadvantageous because wide-band amplified stimulated emission is present at the WDM wavelengths and intentionally discarding some of the amplified signal reduces the gain available from the EDFA, thereby reducing the signal-to-noise ratio. On the contrary, the embodiment of FIG. 5 has that advantage that it does not sacrifice amplifier gain, insofar as the wavelength-selective couplers are efficient, and thus minimizes any reduction in signal gain incurred by the feedback circuit.

The embodiment of FIG. 5 uses two wavelength-selective couplers 54, 56 while the embodiment of FIG. 9 uses two wavelength-insensitive couplers 92, 94. These approaches can be combined, with one coupler being wavelength-selective and the other being wavelength-insensitive. If the input coupler 54 is wavelength-selective, the intensity loss of the input signal is minimized and the bandpass filter 90 can be removed from the feedback loop.

Many types of wavelength-selective couplers are available which can be easily used with optical fibers. A first type is a GRIN rod lens having an interference filter on one side that passes a narrow band to or from the feedback loop and reflects the rest between an input or output fiber and the fiber amplifier. In practice, the interference filter is placed between two GRIN rod lens. A second type is an acousto-optical tunable filter utilizing a photoelastic material such as $LiNbO_3$ which is mechanically modulated by an RF signal applied to interdigitated electrodes overlying the optical waveguide. The frequency of the RF signal corresponds to the wavelength of the optical signal that is affected. Cheung et al. describe such acousto-optical filters as applied to optical fibers in U.S. Pat. No. 5,002,349. A third type is a liquid-crystal switch that selectively deflects different optical wavelengths, as described by Patel et al. In U.S. Pat. Nos. 5,414,540 and 5,414,541. Other functionally similar wavelength-selective couplers are available.

EXPERIMENT

The configuration of FIG. 5 has been experimentally tested. The wavelength-selective couplers 54, 56 were combination of GRIN rod lenses and an interference filter. The interference filter reflected wavelengths of greater than 1535 nm while passing wavelengths of less than 1532 nm. These were configured so that all wavelengths went through the EDFA, only the lower wavelengths went through the feedback loop, and only the higher wavelengths passed to or from the external ports.

In one case, the EDFA 50 was a commercial unit, Model X1706 available from AT&T, which includes an isolator to prevent backward propagation so that only the forward propagating noise signals are allowed to lase. With this EDFA, the ASE signal at 1532 nm was observed to lase. In another case, the EDFA 50 was Model X1712 also available from AT&T, which includes a filter at the peak ASE wavelength. With this EDFA, lasing occurred at 1539 nm, which is assumed to be the wavelength of maximum total gain, that is, gain less loss including filter loss.

Two signals of wavelengths $\lambda_1, \lambda_2$ (1542 nm and 1552 nm) were selectively applied to an erbium-doped fiber amplifier operating in the saturated regime. The power of the signal with the first wavelength $\lambda_1$ was about ten times (+10 dB) that of the signal with second wavelength $\lambda_2$ so that adding or removing the first signal $\lambda_1$ is a more severe condition for the gain experienced by the second signal $\lambda_2$ than the worst possible signal-power variation in an 8-wavelength WDM system. The power spectra of FIG. 10 shows the spectrally resolved optical power output by the gain-stabilized EDFA. Spectrum 80 was measured for the weaker signal of the second wavelength $\lambda_2$ only with no feed back. Spectrum 82 was measured for signals of both wavelengths $\lambda_1, \lambda_2$ with the feedback signal lasing at 1532 nm. Spectrum 84 was measured for the weaker signal of wavelength $\lambda_2$ only with no signal at wavelength $\lambda_1$ but with the feedback signal at 1532 nm. The lasing signal observed at the output is less than the data signals because the wavelength-selective couplers discriminate against the lasing wavelength on their in line outputs. It is noted that the feedback signal at 1532 nm is measured outside of the loop so that its observed intensity is about 100 times less (−20 dB) than its intensity within the loop for the WDM configuration used in the tests.

This experiment shows that in the presence of the 1532 nm feedback signal the presence or absence of the much stronger optical signal at $\lambda_1$ has minimal effect on the amplification of the weaker signal at $\lambda_2$, measured in fractions of a dB. Thus, the invention is effective in reducing the effect of channels being added or removed.

One advantage of doped fiber amplifiers is their slow gain dynamics so that inter-bit interference is not a problem. However, the slow gain dynamics in the presence of strong feedback and varying signal intensities have the capability of inducing oscillations following an intensity change.

Time-resolved gain has been measured in the gain-stabilized EDFA when a channel is abruptly dropped. A characteristic oscillation period of about 20 μs in the intensity of the remaining signal was observed, but the oscillations damped out after about 100 μs. In another experiment, the channel was not abruptly dropped, but was gradually dropped over a time period greater than the characteristic oscillation time. In the test, the channel-dropping time was about 40 μs. No oscillations in the gain of the remaining channel were observed. Thus, it is preferable that the optical network be controlled such that channels are added or dropped with finite transition times. The control algorithm can be implemented with this constraint. Many unplanned changes, such as laser failures, cable cuts, and loss of a power supply, have natural transition times that are acceptably long on this time scale. However, if the oscillations at transition do not produce higher excursions than can be tolerated, then transition times do not need to be additionally controlled.

Both the experiments reported above used the ASE (amplified stimulated emission) radiation around 1532 nm as the source of radiation that is caused to lase in the feedback loop since this wavelength corresponds to the peak ASE. A typical spectrum is shown in FIG. 11 in which 8 WDM channels 100 are evenly spread over the flat gain band of the erbium-doped fiber amplifier in a wavelength comb (although such even spacing is not required) and an ASE signal 102 at the ASE peak is fed back and caused to lase. According to the invention, the number of active WDM channels 100 can change without significantly affecting the gain of the remaining WDM channels 100. This design has the advantage of fully using the flat-gain band of the EDFA and separating the strong lasing signal 102 from the weaker WDM signals. Also, less gain is required to lase the ASE signal since it is already fairly strong. However, the invention can use other wavelength allocations. The principal constraint is that the lasing signal 102 must be located at a wavelength not used by the WDM signals. As shown by the gain spectrum of FIG. 1, the ASE spectrum is relatively wide and any wavelength within the spectrum that avoids the WDM channels can be caused to lase in the feedback loop.

An advantageous wavelength allocation, though technically demanding, is illustrated in the spectrum of FIG. 12. Again, the eight WDM channels 100 occupy the flat-gain band of the EDFA. However, a lasing signal 104 is placed within the WDM comb at a wavelength between two WDM channels 100. This design has the advantage, to be justified later, of the lasing signal 104 also occupying the flat-gain band of the EDFA. The design of FIG. 12 has the disadvantage that the strong lasing signal 104 is separated in wavelength from the adjacent WDM channels 100 by only half the normal WDM inter-channel spacing. A first alternative design avoids this problem by placing the lasing signal either closely above or closely below the WDM wavelength comb. A second alternative design evenly spaces all the signals but assigns one of the middle channels to the lasing signal. In all these spectral assignments, other considerations may favor uneven wavelength spacing of the signals.

Figure 13:
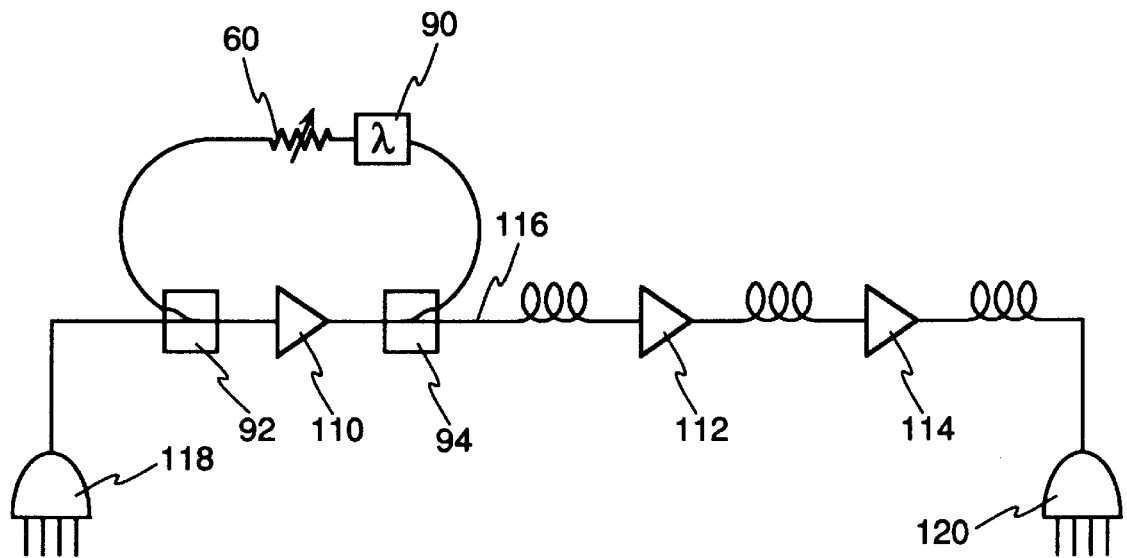
FIG. 13 is an optical network diagram of a first embodiment of particularly advantageous use of the invention involving a chain of amplifiers.

An advantage of the feedback structure of FIG. 9 using wavelength-independent couplers 92, 94 is that the lasing signal is coupled onto the output fiber 52 at an intensity that compensates for any missing WDM channels, that is, at the same intensity relative to the "real channels" that it has within the EDFA. As a result, if a transmission link is long enough to require multiple doped fiber amplifiers, it is only necessary to equalize the gain at the first amplifier if the lasing wavelength is within the flat-gain band. As illustrated in the circuit diagram of FIG. 13, three erbium-doped fiber amplifiers 110, 112, 114 are arranged serially along an optical fiber 116 forming a transmission link. A multiplexer 118 combines multiple WDM signals on the transmitting end, and a demultiplexer 120 separates at least some of the WDM signals on the receiving end. The number of WDM channels entering the link from the multiplexer 118 can vary over time, but along the link the number of channels remains the same. That is, channels are not added or dropped along the link but only possibly at the ends 118, 120 of the link.

A feedback loop including wavelength-independent couplers 92, 94 is provided only for the first amplifier 110. The portion of the fiber 116 between the first and second amplifiers 110, 112 carries both the active WDM channels and lasing signal required for the first amplifier 110 to maintain the proper gain for the remaining WDM channels. If the second amplifier 112 has the same characteristics as the first amplifier 110 and amplifies the WDM signals to the same level, then its gain is properly equalized if the equalizing signal (the laser signal from the first amplifier 110) is within the flat-gain band of the EDFA. The second amplifier 110 also amplifies the equalizing signal so that the same distribution of intensities is incident on the third amplifier 114 and any other amplifier in the serial link. Within the flat-gain band, each amplifier in the chain amplifies the WDM and equalizing signals to the same relative intensities.

Only the first amplifier 110 is a stabilized-gain amplifier. The downstream amplifiers 112, 114 are preferably operated in saturation, that is, fixed output per channel. As a result, if added loss is introduced into the link by damage to the fiber, connector going bad, etc., the saturated operation can to some extent compensate for this new loss.

Figure 14:
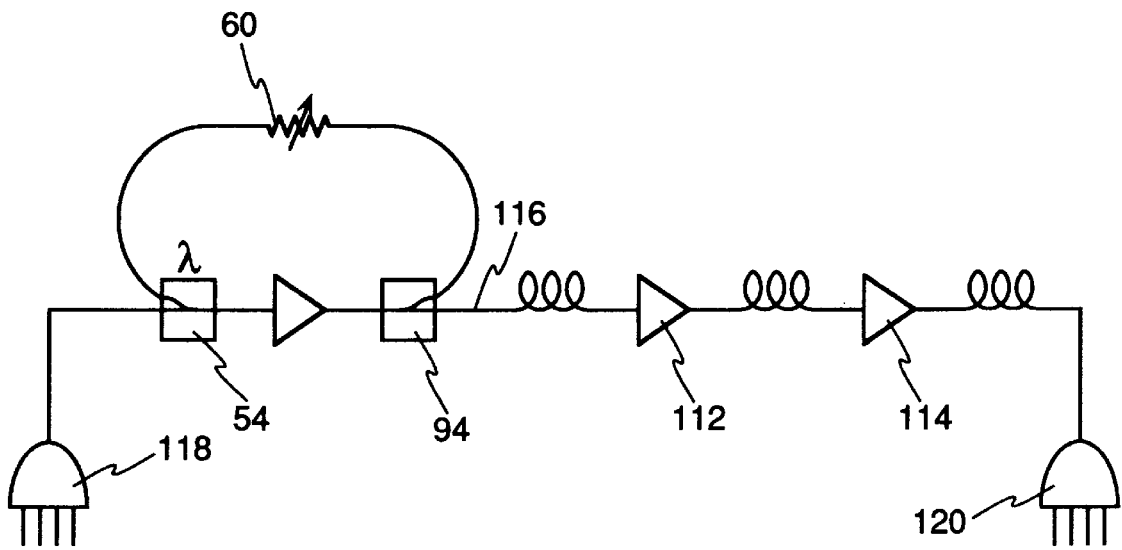
FIG. 14 is an optical network diagram of a second embodiment similar to the first embodiment of FIG. 13.

A more preferred embodiment of the first-stage amplifier, as illustrated in FIG. 14, includes the wavelength-selective coupler 54 on the input side and the wavelength-insensitive coupler 94 on the output side. The wavelength-selective input coupler 54 eliminates the need for the bandpass filter 90, but the wavelength-independent output coupler couples out all signals with the same efficiency, thus guaranteeing that the feedback signal will have the same intensity relative to the data signals on the output as in the fiber amplifier 50.

Although the variable optical attenuator in the feedback loop of the examples was mechanically adjusted, other types of attenuators can be utilized. Indeed, an attenuator can be placed in the amplifier portion of the loop if it can selectively attenuate the selected lasing wavelength over the WDM wavelengths, e.g., a variable wavelength-selective coupler which could be functionally incorporated into the coupler 54, 56, even though this is a complicated configuration.

The absence of feedback loops in subsequent amplifiers simplifies the design and reduces the cost of long transmission links, and provides the further advantage that all amplifiers are operated in saturation with fixed output per channel rather than fixed total gain.

Commercially available erbium-doped fiber amplifiers typically include isolators to prevent backward propagation through the amplifier and perhaps also include an ASE filter in line with the amplifier to suppress the ASE peak. With the invention, these components need to be reconsidered. Insofar as wavelength-selective couplers are used at the peak ASE wavelength, the need for backward isolators is reduced since the selected wavelengths of the ASE radiation is mostly coupled into the feedback loop rather than backwardly to the transmitter. Nonetheless, there will be leakage in the backward direction. Insofar as backward isolators are required, they can be inserted at different places.

Figure 15:
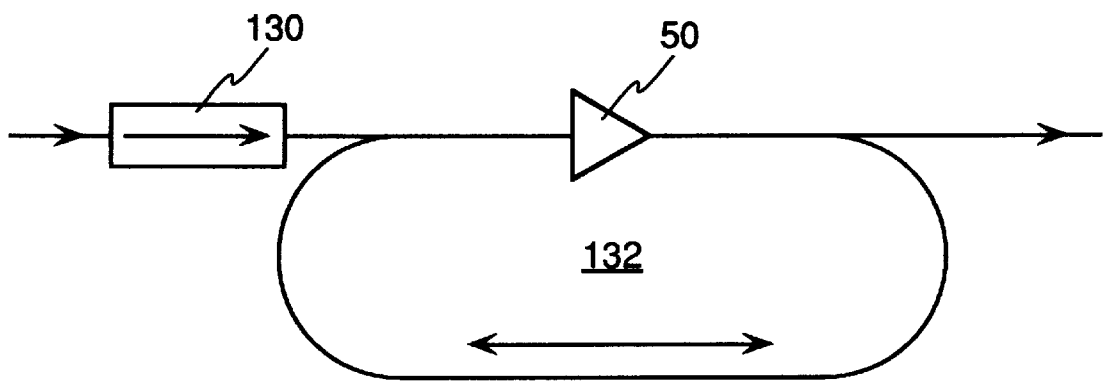
FIGS. 15 and 16 are optical network diagrams illustrating possible placements of optical isolators.

As illustrated FIG. 15, an isolator 130 can be placed outside of the feedback loop 132 on the input side to block backwardly propagating light. This configuration allows feedback to circulate in both directions around the loop (unless other means are used to block the counter-clockwise feedback), and the isolator 130 thus protects the transmitter from spurious signals from the amplifier 132, including counter-clockwise rotating lasing light leaking from the loop. While this configuration has the advantage that loop loss is minimized, it is disadvantageous for a multi-stage amplifier string, as in FIG. 13, because only the clockwise rotating laser light exits the loop 132 on the output side so that the ratio of signal and laser intensities is different in the amplifier 50 and on the output.

Figure 16:
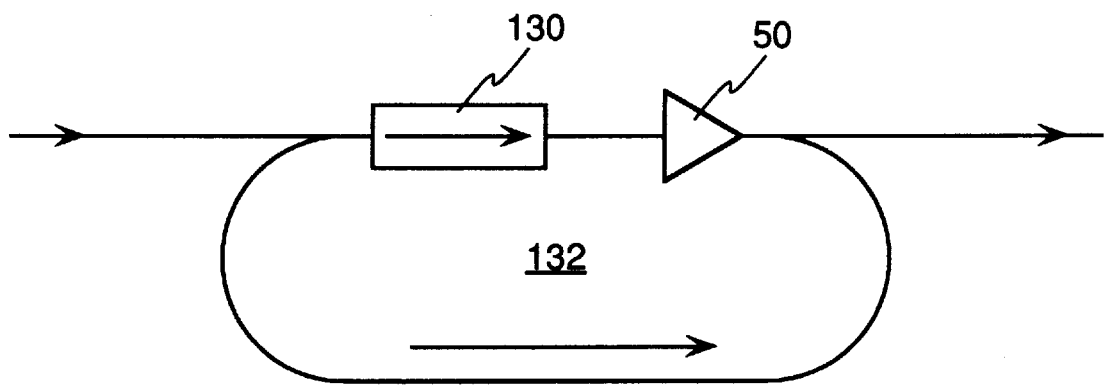

Alternatively, as illustrated in FIG. 16, the isolator 130 can be placed within the loop 132 on the input side of the amplifier 50. This configuration prevents feedback in the counter-clockwise direction and thus is consistent with the multi-stage amplifier strings of FIGS. 13 and 14 since it assures the same relative intensities of signal and laser light inside and outside the loop 132.

Similarly, the need for ASE filters with the stabilized amplifier of the invention appears to be reduced since most ASE radiation is restricted to the feedback loop, especially for wavelength-selective coupling with a passband at the peak ASE wavelength.

Although the invention is particularly useful for erbium-doped fiber amplifiers because of the present degree of commercialization, the invention can be applied to fiber amplifiers doped with other active species. Indeed, the invention is applicable to any optical amplifier that operates in the saturation region and carries uncertain number of wavelength-multiplexed signals.

The invention thus provides an economical and automatic equalization mechanism for wavelength-division multiplexed optical communication systems.

What is claimed is:

1. A stabilized optical amplifier, comprising:
   an optical amplifier receiving an optical data signal of one or more wavelengths on an input side, amplifying said signal, and outputting said signal on an output side;
   first and second wavelength-selective optical couplers connected respectively to said input and output sides, respectively to input and output optical channels, and to ends of an optical feedback path included in a feedback loop including said optical amplifier, wherein said wavelength-selective optical couplers block said optical data signal from said feedback loop and pass a feedback signal having a feedback wavelength different than said one or more wavelengths of said optical data signal; and
   an optical attenuator included in said feedback loop and, together with said wavelength-selective couplers, selectively attenuating said feedback signal.

2. The amplifier of claim 1, wherein said optical amplifier is a doped fiber amplifier.

3. The amplifier of claim 2, wherein said optical attenuation includes a variable attenuator included in said feedback path.

4. The amplifier of claim 1, wherein said optical data signal comprises a wavelength-division multiplexed signal of multiple channels assigned to a plurality of WDM wavelengths different from said feedback wavelength, whereby said amplifier compensates for a varying number of active ones of said channels.

5. The stabilized optical amplifier of claim 1, further comprising a second optical amplifier connected in serial to receive said signal from said optical amplifier, said second optical amplifier not having an optical feedback loop of amplified stimulated emission.

6. A wavelength-division multiplexed optical link, comprising:
   a first erbium-doped fiber optical amplifier receiving an optical data signal having N wavelength channels, each wavelength channel having a carrier wavelength, where N is a varying integer number greater than one, said first erbium-doped fiber optical amplifier including an optical feedback loop selective to a wavelength band including a selected wavelength different than the carrier wavelengths of the N wavelength channels, and outputting an amplified output optical signal having the N wavelength channels and the selected wavelength; and
   a second erbium-doped fiber optical amplifier connected with said first erbium-doped fiber optical amplifier to receive and amplify said output optical signal,
   wherein when a number of active channels in said wavelength channels changes, a total optical power of said wavelength channels and said selected wavelength received by said second erbium-doped fiber optical amplifier is substantially constant such that said second erbium-doped optical amplifier maintains a substantially constant gain for each wavelength channel.

7. The optical link of claim 6, wherein the second erbium-doped fiber optical amplifier does not include an optical feedback loop selected to a wavelength of amplified stimulated emission.

8. The optical link of claim 6, wherein the selected wavelength is selected using a band-pass device.

9. A wavelength-division multiplexed optical link, comprising a plurality of optical amplifiers serially connected along optical fiber link, wherein a first of said serially connected amplifiers includes an optical feedback loop selective to a wavelength band including a selected wavelength and capable of lasing a signal of said selected wavelength together with said first amplifier, a portion of said lasing signal being output from said first amplifier toward a second one of said serially connected amplifiers; and wherein at least some amplifier other than said first amplifier not including an optical feedback loop of amplified stimulated emission at the selected wavelength receives and amplifies said lasing signal.

10. The optical link of claim 9, wherein said optical amplifier comprises a doped fiber amplifier.

11. The optical link of claim 10, wherein said doped fiber amplifier includes a flat gain wavelength band occupied by said selected wavelength and by a plurality of wavelengths assigned to plural channels in a wavelength-division multiplexed optical signal.

12. The optical link of claim 11, wherein said selected wavelength is disposed between said plurality of wavelengths.

13. The optical link of claim 9, wherein said optical fiber link carries a plurality of wavelength-division multiplexed signals having respective wavelengths falling within a flat band portion of said first amplifier and wherein said selected wavelength falls within said flat band portion.

14. The optical link of claim 9, wherein said feedback loop includes wavelength-insensitive couplers at input and output ends of said optical amplifier.

15. The optical link of claim 14, wherein said feedback loop includes a filter selectively passing said selected wavelength.

16. The optical link of claim 15, wherein said feedback loop additionally includes a controlled attenuator.

17. The optical link of claim 9, wherein the selected wavelength is selected using a band-pass device.

18. The optical link of claim 9, wherein the selected wavelength is selected using a low-pass device.

19. The optical link of claim 9, wherein the selected wavelength is selected using a high-pass device.

20. The optical link of claim 9, wherein said feedback loop includes a wavelength-selective coupler at an input end of said optical amplifier and a wavelength-insensitive coupler at an output end of said optical amplifier.

21. A stabilized optical amplifier in a wavelength-division multiplexed optical network having a variable number of N or less wavelength channels of respective WDM wavelengths conveyed to said amplifier, comprising:

a doped fiber amplifier to receive said WDM wavelength of said wavelength channels, said doped fiber amplifier having a flat gain wavelength band that excludes a principal peak of amplified stimulated emission; and an optical feedback loop including an attenuator connected around said optical amplifier by first and second wavelength selective optical couplers to selectively pass a feedback signal having a feedback wavelength other than those of said wavelength channels;

wherein said WDM wavelengths and said feedback wavelength are located within said flat gain wavelength band of said doped fiber amplifier.

22. The amplifier of claim 21, wherein said feedback wavelength has a value intermediate values of said WDM wavelengths.

23. The amplifier of claim 21, wherein said attenuator is set so that said feedback signal lases when all of said N wavelength channels are being received by said amplifier.

24. The amplifier of claim 21, wherein said doped fiber amplifier is an erbium-doped fiber amplifier.

25. An optical amplifier system, comprising:

an optical amplifier;

an optical feedback path;

a first optical coupler that is wavelength selective to a first wavelength within a wavelength band and having a first input connected to a wavelength division multiplexed signal input path, a second input connected to a first end of said optical feedback path and an output connected to an input side of said optical amplifier; and a second optical coupler that is substantially wavelength independent within said wavelength band and having an output connected to an output path, a first input connected to a second end of said optical feedback path and a second input connected to an output side of said optical amplifier.

26. The amplifier system of claim 25, wherein said optical amplifier is a doped fiber amplifier.

27. The amplifier system of claim 25, further comprising an adjustable attenuator disposed in said feedback path.

28. The amplifier system of claim 25, further comprising an isolator disposed between said first coupler and said optical amplifier.

29. The optical amplifier system of claim 25, further comprising a second optical amplifier connected in serial to receive signals from said optical amplifier, said second optical amplifier not coupled with an optical feedback path to define a feedback loop of amplified stimulated emission.

30. A method of stabilizing gain in a doped fiber amplifier, comprising the steps of:

a first step of inputting to an amplifier system one or more first signals selected from a plurality of wavelength-division multiplexed signals, said amplifier system including a doped fiber amplifier and a feedback loop for feeding back through said doped fiber amplifier a feedback signal different from said first signals;

a second step of inputting to said amplifier system one or more second signals selected from said plurality of wavelength-division multiplexed signals, wherein said first and second signals differ by one or more third signals; and between said first and second inputting steps, varying an optical intensity of said one or more third signals over a time period longer than a characteristic oscillation damping period of said doped fiber amplifier.

31. The method of claim 30, wherein said doped fiber amplifier is an erbium-doped fiber amplifier and said characteristic oscillation damping period is 20 $\mu$s.

32. A wavelength-division multiplexed optical link, comprising:

a first optical amplifier receiving a variable number of N or less wavelength channels, said first optical amplifier including an optical feedback loop selective to a wavelength band including a selected wavelength, said first optical amplifier outputting a laser signal of said selected wavelength together with said variable number of wavelength channels; and a second optical amplifier connected with said first optical amplifier to amplify said variable number of wavelength channels and said laser signal, said second optical amplifier not including an optical feedback loop of amplified stimulated emission, wherein when a number of active channels in said variable number of wavelength channels changes, a total optical power of said wavelength channels and said laser signal received by said second optical amplifier is substantially constant such that said second optical amplifier maintains a substantially constant gain for each wavelength channel.

33. The optical link of claim 32, wherein the selected wavelength is selected using a band-pass device.

* * * * *